(12) United States Patent
Szapiel

(10) Patent No.: US 9,557,553 B2
(45) Date of Patent: Jan. 31, 2017

(54) ELECTRONIC EYEBOX

(71) Applicant: RAYTHEON CANADA LIMITED, Ottawa (CA)

(72) Inventor: Stanislaw Szapiel, Port Mcnicoll (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 44 days.

(21) Appl. No.: 14/050,887

(22) Filed: Oct. 10, 2013

(65) Prior Publication Data
US 2015/0103155 A1  Apr. 16, 2015

(51) Int. Cl.
| | |
|---|---|
| G03B 13/00 | (2006.01) |
| H04N 5/232 | (2006.01) |
| G03B 1/00 | (2006.01) |
| G02B 23/14 | (2006.01) |
| G02B 27/00 | (2006.01) |
| H04N 5/33 | (2006.01) |
| H04N 5/225 | (2006.01) |

(52) U.S. Cl.
CPC .......... *G02B 23/14* (2013.01); *G02B 27/0093* (2013.01); *H04N 5/2256* (2013.01); *H04N 5/23293* (2013.01); *H04N 5/33* (2013.01)

(58) Field of Classification Search
CPC ..................... G02B 27/225; G09G 2320/0247; G09G 2320/0261; G09G 3/001; G09G 3/025; A61B 3/1025; A61F 2009/00846
USPC ........... 348/208.14, 78, 80; 382/103; 396/51
See application file for complete search history.

(56) References Cited

U.S. PATENT DOCUMENTS

| | | | | |
|---|---|---|---|---|
| 6,005,710 A | * | 12/1999 | Pensel .................. | A61B 3/0025 250/201.3 |
| 6,157,352 A | * | 12/2000 | Kollin .................. | G02B 26/101 345/7 |
| 6,204,829 B1 | * | 3/2001 | Tidwell .................. | G02B 7/287 345/7 |
| 6,394,602 B1 | | 5/2002 | Morrison et al. | |
| 6,433,760 B1 | * | 8/2002 | Vaissie .................. | G01S 17/875 345/8 |
| 6,473,246 B1 | * | 10/2002 | Chao .................. | G02B 26/0875 359/298 |
| 6,634,749 B1 | * | 10/2003 | Morrison ............... | A61B 3/113 351/209 |
| 8,360,583 B2 | * | 1/2013 | Watanabe ........................ | 353/28 |
| 2001/0011968 A1 | * | 8/2001 | Tidwell .................. | G02B 7/287 345/8 |
| 2002/0167462 A1 | * | 11/2002 | Lewis ................ | G02B 27/0093 345/7 |

(Continued)

FOREIGN PATENT DOCUMENTS

| | | |
|---|---|---|
| EP | 1131663 A1 | 9/2001 |
| WO | 2013103443 A1 | 7/2013 |

OTHER PUBLICATIONS

C. Curatu, H. Hua, and J. Rolland, Projection-based head-mounted display with eye tracking capabilities, Proceedings of SPIE vol. 5875, Novel Optical Systems Design and Optimization VIII, 58750J (2005), doi: 10.1117/12.618715.*

*Primary Examiner* — Jamie Atala
*Assistant Examiner* — Richard A Hansell, Jr.
(74) *Attorney, Agent, or Firm* — Lando & Anastasi, LLP

(57) ABSTRACT

Methods and apparatus for automatically expanding the eyebox of an optical imaging device by tracking the movement of an operator's eye, and automatically repositioning the exit pupil of the optical imaging device to follow the movement of the eye.

13 Claims, 2 Drawing Sheets

(56) References Cited

U.S. PATENT DOCUMENTS

| | | | | |
|---|---|---|---|---|
| 2010/0302499 A1* | 12/2010 | Watanabe | ............ | G02B 5/1828 |
| | | | | 349/201 |
| 2013/0010097 A1* | 1/2013 | Durnell | .................. | A61B 3/113 |
| | | | | 348/78 |
| 2013/0077024 A1* | 3/2013 | Shikii | .................. | G02B 17/004 |
| | | | | 349/62 |
| 2013/0170022 A1 | 7/2013 | Caldeira et al. | | |

* cited by examiner

ELECTRONIC EYEBOX

BACKGROUND

Magnified telescopic sights, such as rifle scopes and spotting scopes, for example, frequently suffer from very small exit pupil size. When the exit pupil diameter of the device is approximately the same size or smaller than the diameter of the pupil of the operator's eye, it is increasingly difficult to keep the eye within the effective eyebox of device. Moving the eye out of the eyebox results in severe vignetting or total loss of the observed image.

For example, if the diameter of the exit pupil of a telescope is about 2 millimeters (mm) or less, the operator must try to keep his/her head extremely stable, even if the device is equipped with a tripod, in order to keep the eye within the eyebox. Very small, sub-millimeter movements of the operator's head can have significant impact. Therefore, even people who are trained to work with instruments having tight eyeboxes, such as snipers or competitive sports shooters, for example, may be not able to keep their heads sufficiently stable, particularly under such circumstances as intensive physical effort (for example, after a fast run), stress, or exhaustion. In addition, it may take several seconds to achieve proper match of the operator's eye and the eyebox of the device.

In view of these difficulties, it is highly desirable to have the size of the eyebox significantly larger than the size of the pupil of the eye. However, conventionally this requirement leads to larger front optics and increased total length of the device, particularly for devices with higher magnification. First principles of geometric optics dictate that it is not possible to generate a large exit pupil in combination with a relatively small entrance pupil and magnification of the telescope significantly larger than one. This is because the magnification of an afocal telescope is given by the ratio of the diameter of the entrance pupil to the diameter of the exit pupil. Thus, for example, if the diameter of exit pupil is 2 mm and the required magnification is 25×, the resulting diameter of entrance pupil is 50 mm. A typical length estimate for such a telescope is then at least 11-12 inches, if not significantly more. Doubling the diameter of the exit pupil to 4 mm, which would significantly improve matching the eye to the eyebox, causes a corresponding increase in the entrance pupil diameter to 100 mm, and this results in a telescope that is too heavy and too long to use as a riflescope or portable spotting telescope.

SUMMARY OF INVENTION

Conventionally, the need for a large exit pupil combined with high magnification inevitably results in large, heavy and very expensive telescopes. Since the problem is fundamental, and largely resulting from first principles of geometrical optics, there is little that can be done to address the problem by optics alone. Accordingly, there is a need for a solution to this problem which may offer a larger eye box without demanding larger, longer, and heavier telescopes. Aspects and embodiments are directed to a system that expands the eyebox of an optical instrument, such as a rifle scope, spotting scope, microscope, borescope, or endoscope, by following the spatial movements of the operator's eye or head with the original small eyebox of the optical instrument, as discussed in more detail below.

According to one embodiment, an apparatus comprises an optical imaging device including an optical deflector unit, and an eyepiece configured to produce a real exit pupil located remote from the eyepiece, an infrared illuminator unit configured to project infrared electromagnetic radiation onto an eye of an operator of the optical imaging device, an eye-shift sensor unit configured to produce an image of the eye, the image of the eye including a spot representative of the exit pupil, and a digital image processor unit coupled to the eye-shift sensor unit and configured to receive and process the image of the eye to determine an offset between an iris of the eye and the exit pupil, and to generate feedback data based on the offset. The optical deflector unit is coupled to the digital image processor unit, and configured receive the feedback data from the digital image processor unit, and to relocate the exit pupil of the optical imaging device responsive to the feedback data to reduce the offset between the iris of the eye and the exit pupil.

In one example, the eye-shift sensor unit includes a digital camera. In another example, the optical imaging device further includes front optics configured to receive electromagnetic radiation and focus the electromagnetic radiation onto an intermediate focal plane, and the eyepiece is configured to relay the electromagnetic radiation from the intermediate focal plane to the eye. The optical deflector unit may be positioned within the eyepiece, or between the front optics and the eyepiece, for example. In one example the optical deflector unit is positioned between the intermediate focal plane and the exit pupil, proximate the intermediate focal plane. In one example the optical deflector unit includes a field lens. The optical imaging device may be a telescopic sight (e.g., a rifle scope or spotting scope), a microscope, or an endoscope, for example.

According to another embodiment, a method of automatically adjusting an eyebox of an optical imaging device comprises imaging an eye of an operator of the optical imaging device to produce an image of the eye, the image of the eye including a spot representative of an exit pupil of the optical imaging device, analyzing the image of the eye with a digital image processor unit to determine a relative offset between an iris of the eye and the exit pupil of the optical imaging device, and controlling an optical deflector unit associated with the optical imaging device to re-position the exit pupil to compensate for the relative offset between the iris of the eye and the exit pupil to re-center the exit pupil with the eye.

In one example of the method, imaging the eye includes illuminating the eye with infrared electromagnetic radiation. In another example, controlling the optical deflector unit includes providing feedback data to the optical deflector unit from the digital image processor unit, the feedback data being based on the determined relative offset between the iris of the eye and the exit pupil of the optical imaging device. In another example in which the optical deflector unit includes a field lens, controlling the optical deflector unit includes controlling decentering of the field lens in two orthogonal axes relative to an optical axis of the optical imaging device.

According to another embodiment, an apparatus comprises an optical imaging device configured to receive and focus electromagnetic radiation to an exit pupil of the optical imaging device, an optical deflector unit configured to redirect the electromagnetic radiation to reposition the exit pupil of the optical imaging device, and means for tracking movement of an eye of an operator of the optical imaging device and controlling the optical deflector unit to reposition the exit pupil so as to maintain alignment of the exit pupil and the eye.

In one example, the optical imaging device includes front optics configured to receive and focus the electromagnetic radiation onto an intermediate focal plane, and an eyepiece configured to relay the electromagnetic radiation from the intermediate focal plane to the eye. In one example the optical deflector unit is positioned between the intermediate focal plane and the exit pupil, proximate the intermediate focal plane. In another example the optical deflector unit includes a field lens, and the means for tracking is configured to control decentering of the field lens in two orthogonal axes relative to an optical axis of the optical imaging device to reposition the exit pupil. In another example the means for tracking includes a digital camera configured to produce an image of the eye, and a digital image processor unit coupled to the digital camera and to the optical deflector unit, and configured to receive and process the image of the eye to generate feedback data for controlling the optical deflector unit. In one example the image of the eye includes a spot representative of the exit pupil, and the digital image processor unit is configured to process the image of the eye to determine an offset between the exit pupil and an iris of the eye, and to generate the feedback data based on the offset. In another example, the means for tracking further includes an infrared illuminator unit configured to illuminate the eye with infrared electromagnetic radiation.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a system that automatically expands the eyebox of an optical imaging device to improve ease of use of the telescope without requiring larger, heavier optics. Examples of optical imaging devices in which embodiments of the system may be used include, but are not limited to, telescopic sights (such as rifle scopes or spotting scopes, for example), microscopes, endoscopes, or other optical imaging devices which have an eyepiece that produces a remotely located real exit pupil for use by a human operator. As discussed in more detail below, the system is configured to track the movement of an operator's eye, and automatically cause the eyebox, including the exit pupil, to follow the movement of the eye. Thus, the system creates operator perception of an expanded eyebox by following the spatial movement of the eye with the eyebox of the telescope. In this manner, an operator does not experience significant vignetting or loss of the imaged field of view (FOV) even when moving the head and/or hands. As discussed in more detail below, in one embodiment the system includes a magnified telescopic sight, either with a prismatic erector or a lens-based erector, an infrared illuminator unit which projects infrared radiation onto a moving eyeball, an eye-shift sensor unit (for example a miniature camera) that observes the illuminated eyeball, a digital image processor unit which receives image from the sensor unit and calculates feedback data, and an optical deflector which receives the correction data and relocates the exit pupil of the telescope to the correct location in which it will be centered on the iris of the eye The perception, and benefits, of a larger eyebox may thus be created without requiring significant changes to the optics of the telescope, and substantially without affecting the size of the entrance pupil, field of view, and magnification of the telescope.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
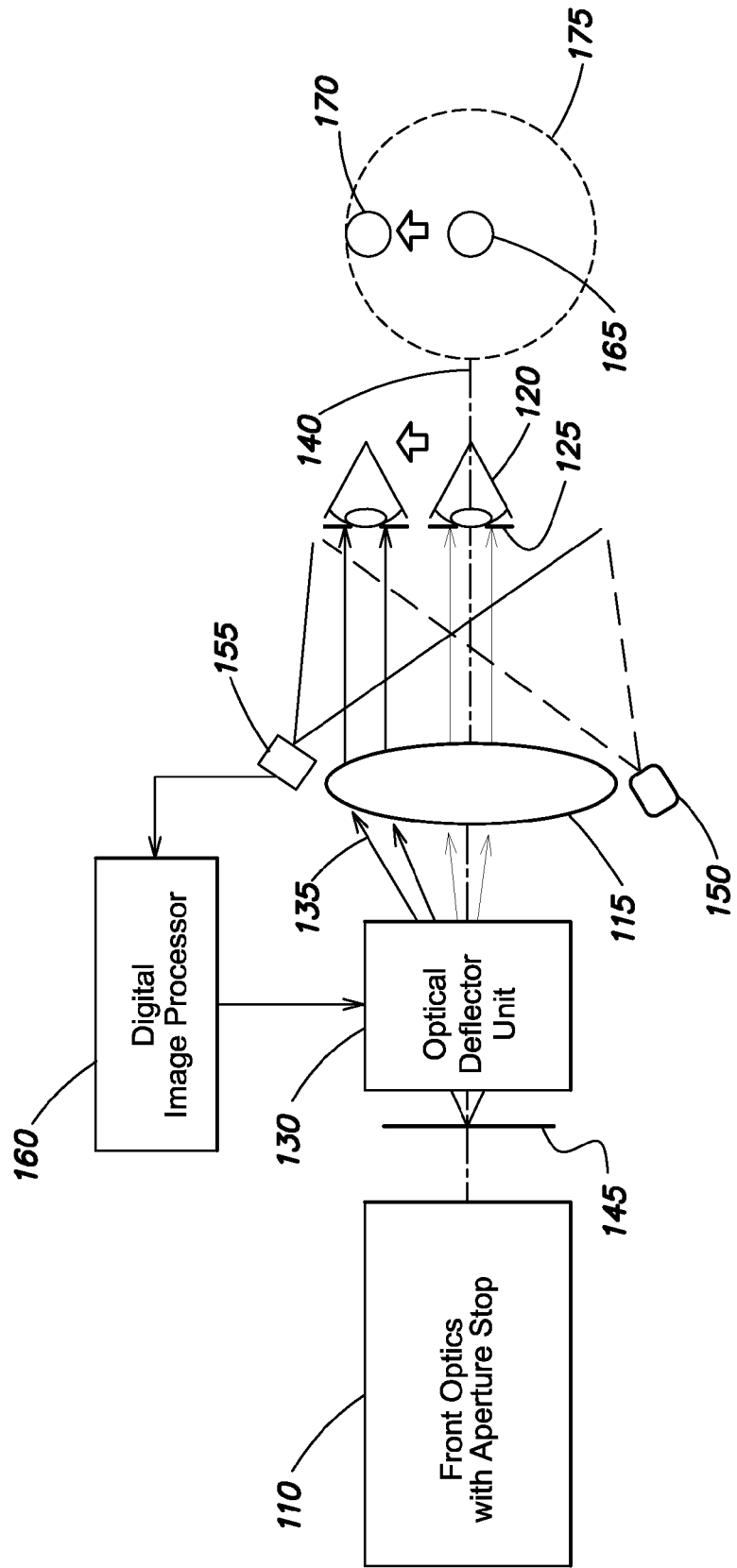
FIG. 1 is a block diagram of one example of a system including an electronic eyebox according to aspects of the invention.

Referring to FIG. 1, there is illustrated a block diagram of one example of a system incorporating an electronic eyebox according to aspects of the present invention. As discussed above, the system may be implemented in any type of optical imaging device or telescope, including, but not limited to, rifle or other weapon scopes or sights, spotting scopes, and other devices having an eyepiece that produces a remotely located real exit pupil. The telescope includes front optics 110 which include the aperture stop of the telescope. The telescope further includes an eyepiece 115. Together, the front optics 110 and eyepiece 115 direct and focus incident electromagnetic radiation onto the operator's eye 120 to allow the operator to view an imaged scene. To effectively view the scene (or entire imaged field of view), the operator must place his/her eye 120 in a plane where the exit pupil 125 of the telescope is formed. At the exit pupil, the focused electromagnetic radiation forms a "bright spot" which may be imaged to reveal the location of the exit pupil, as discussed further below. In one embodiment, the front optics 110 and eyepiece 115 together provide a magnified telescopic sight. Although not illustrated in FIG. 1, the sight may include either a prismatic erector or a lens-based erector for image formation, as known to those skilled in the art.

The system further includes an optical deflector unit 130 that is configured to adjustably deflect the beam of electromagnetic radiation received from the front optics 110 to compensate for movement of the eye 120, as discussed further below. As the eye 120 moves away from the optical axis 140 of the telescope, the optical deflection unit 130 redirects the beam of electromagnetic radiation 135 so effectively "move" the original eyebox of the telescope (including the exit pupil 125) to follow the movement of the eye 120, as shown in FIG. 1. Circle 165 represents the original location of the exit pupil 125. As the eye 120 moves, the optical deflector unit 130 repositions the exit pupil 125 to location 170, such that the exit pupil is re-centered on the eye 120. Circle 175 represents the boundary of the "electronic eyebox" which is created by moving the exit pupil 125 to follow the movement of the eye 120. As may be seen in FIG. 1, the electronic eyebox bounded by circle 175 may be significantly larger than the diameter of the original exit pupil 125. The diameter of the boundary circle 175 may be determined, at least in part, by the angular range over which the optical deflector unit 130 may redirect the beam of electromagnetic radiation 135.

Thus, through provision of the larger electronic eyebox, the operator will not experience vignetting or loss of the imaged field of view even when moving the head and/or hands. In contrast, conventionally, such movement of the operator's head and/or hands would result in a mismatch between the location of the eye 120 and the location of the exit pupil 125, resulting in vignetting and/or loss of the imaged field of view, as discussed above. Although the physical size of eyebox remains unchanged, the eyebox is "delivered" to the current location of the eye 120, as illustrated in FIG. 1. Control of movement of the eyebox (eyebox delivery) may be effected using either of two methods, as discussed in more detail below. In one embodiment, eyebox delivery is accomplished with a closed loop control mode using an eye pupil tracking device integrated into the telescope. In another embodiment, eyebox delivery is accomplished using an open loop control mode in which the eyebox is periodically replicated in time at the position where the eye 120 is currently located by continuous or discrete scanning over the space of interest.

According to one embodiment, the original optical parameters of the telescope in which the electronic eyebox is implemented, such as magnification, field of view, eye relief, etc., may remain substantially unchanged. The eyepiece portion of the telescope may be modified to accommodate the optical deflector unit 130. In one embodiment, the optical deflector unit 130 is part of the eyepiece 115. However, the optical deflector unit 130 may be either internal or external with respect to the telescope. As illustrated in FIG. 1, the optical deflector unit 130 is located after the final intermediate focal plane 145 and therefore its action does not change relationship between the image of a viewed target and the reticle. In other words, line of sight and aiming are not disturbed by the action of the optical deflector unit 130. In contrast, deflector units in conventional telescopes having image stabilization always change line of sight while keeping the image stable in the focal plane. Such conventional devices are not suitable for shooting. However, aspects and embodiments of the electronic eyebox described herein may be implemented in image-stabilized telescopes used for observation only (such as binoculars or spotting scopes, for example). In such embodiments, the resulting device includes both an image-stabilizing deflector and the optical deflector unit 130, and may provide both a stabilized image and electronic eyebox capability.

According to one embodiment, it may be preferred that the optical deflector unit 130 is located as close as possible to the final intermediate focal plane 145, such that its action on the final image as observed in the eye is negligible. This is a consequence of the fact that the final image is a geometric optical conjugate of the intermediate image. Thus, in this configuration, the optical deflector unit 130 may have little to no effect on the final image, while producing maximum scan effect on the exit pupil of the optical system.

According to another embodiment, the optical deflector unit 130 may be located further away from the intermediate focal plane 145. In this case, the optical deflector unit 130 may produce both useful exit pupil movement, as discussed above, and also movement of the final image on the retina of the eye 120. An operator may perceive this image movement as wandering of the observed target when using the electronic eyebox; however, this may be acceptable in certain applications and/or depending on the magnitude of the wander effect. Additionally, in practice it may not be possible to achieve perfect collimation of the optical beam, or perfect parallelism between the deflected collimated beam and the initial collimated beam in the eye-space, even when the optical deflector unit 130 is positioned approximately at the intermediate focal plane. As a result, some wandering of the beam in the eye-space may occur, and there may be certain locations of the optical deflector unit 130 in the optical train at which these effects are worsened. Accordingly, a system designer may select the location of the optical deflector unit 130 in the optical train with these considerations, such that appropriate tracking of the eye movement may be achieved while any beam wander may be maintained within acceptable limits.

Since in certain embodiments it may be preferable to position the optical deflector unit 130 at or very close to the intermediate focal plane 145, the optical deflector unit 130 may be implemented using a "field lens." Field lenses are used in eyepieces and optical relays, and by definition, the field lens is inserted very close to the intermediate focal plane such that it does not change the magnification or field of view of the optical system. The field lens does change the eye relief, and a relatively strong negative lens may significantly increase the eye relief of a scope, for example. By controlling the X and Y decentering of a field lens (X and Y denoting shifts orthogonal to the optical axis of the telescope), appropriate relocation of the exit pupil 125 may be achieved to follow the movement of the eye 120, as discussed above. In other examples, the optical deflector unit 130 may include any of numerous well-known adjustable beam-deflecting devices, including, for example, a Risley prism, one or more tiltable mirrors, a mechanical wedge, a liquid wedge, and the like.

Still referring to FIG. 1, as discussed above, in one embodiment tracking of movement of the eye 120 is accomplished using an infrared illuminator 150, and eye-shift sensor unit 155, and a digital image processor unit 160, in combination with the optical deflector unit 130. The digital image processor unit 160 is coupled to the eye-shift sensor unit 155 and the optical deflector unit 130. The infrared illuminator unit 150 is configured to project infrared electromagnetic radiation onto the eye 120, thereby illuminating the eye. The infrared illuminator unit 150 may project a beam of infrared radiation, or in some examples, a structured pattern (such as a rectangular grid, for example) of infrared illumination onto the eye 120 (and optionally surrounding facial features or regions). The infrared illuminator unit 150 is configured to illuminate the eye 120 with infrared electromagnetic radiation because the infrared spectral band is invisible to the human eye, and therefore will not interfere with the operator's ability to view the imaged field of view of the telescope. Additionally, using infrared radiation also prevents the operator's face from being visibly illuminated and his/her location from being revealed in darkness or low light as a result.

The eye-shift sensor unit 155 is configured to observe and image the illuminated eye 120 and the exit pupil 125 of the telescope. In one example, the eye-shift sensor unit 155 includes a camera, in particular, a digital camera, that provides digital images of the eye 120. As discussed above, the electromagnetic radiation focused by the telescope forms a "bright spot" at the exit pupil. The eye-shift sensor unit 155 may image this bright spot when it is projected onto a surface, for example, the eye 120 or other facial regions, which reveals the location of the exit pupil 125, along with the illuminated eye 120. The eye-shift sensor unit 155 is coupled to the digital image processor unit 160 and provides the digital images to the digital image processor unit 160. The digital image processor unit 160 may process the images obtained from the eye-shift sensor unit 155 to determine and compare the location of the exit pupil 125 relative to the location of the iris of the eye 120. Based on this analysis, the digital image processor unit 160 may calculate feedback data that is provided to the optical deflector unit 130 to control the optical deflector unit 130 to change the angle of deflection of the electromagnetic radiation output therefrom and thereby relocate the exit pupil 125 to the correct location in which it will be approximately centered on the iris of the eye 120.

Figure 2:
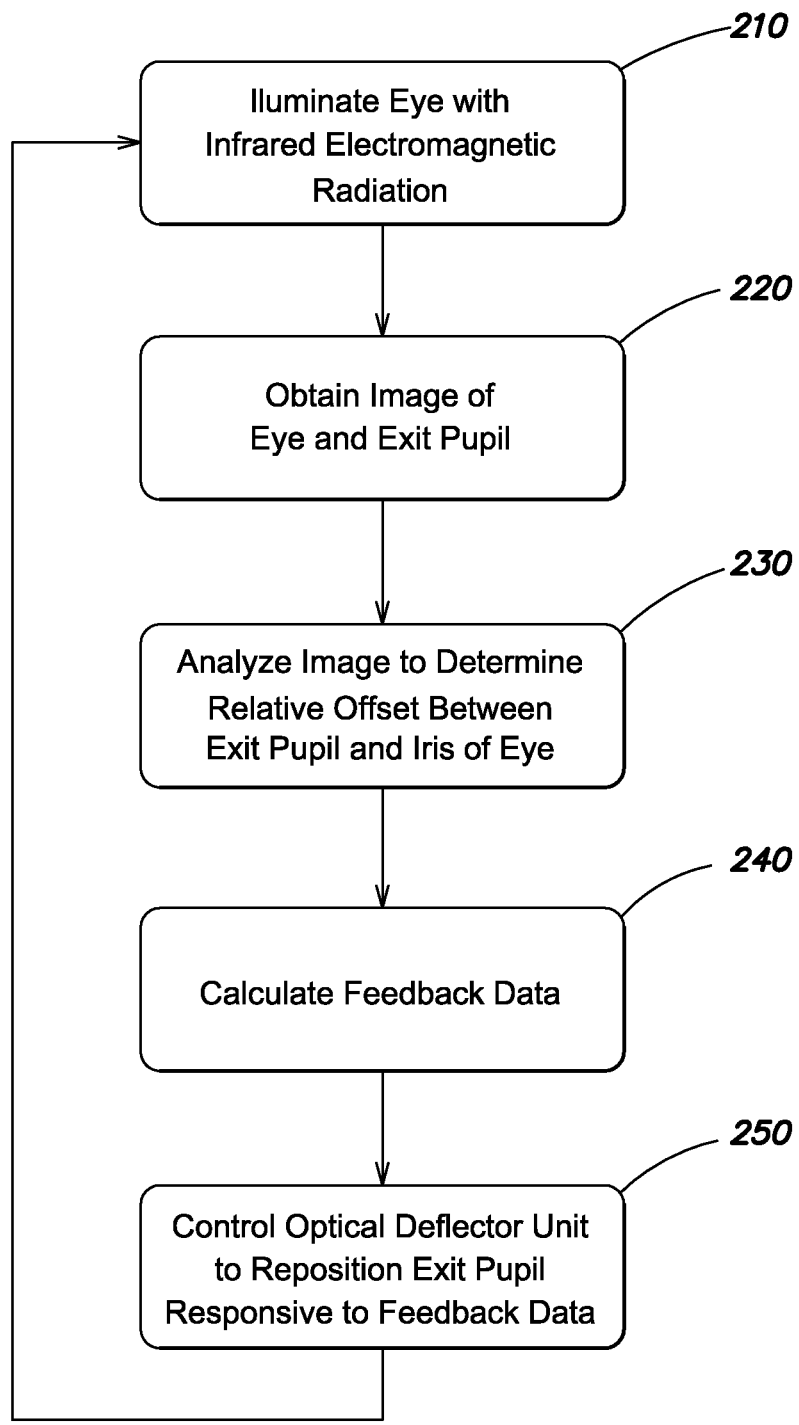
FIG. 2 is a flow diagram of one example of a method of automatically adjusting the electronic eyebox according to aspects of the invention

Referring to FIG. 2 there is illustrated a flow diagram of one example of a method of controlling the exit pupil location in a telescope according to one embodiment. As discussed above, in a first step 210, the infrared illuminator unit 150 is operated to illuminate the eye 120. In step 220, the eye-shift sensor unit 155 is operated to obtain an image of the illuminated eye 120. As discussed above, the image also contains an image of the "bright spot" formed by the focused electromagnetic radiation at the exit pupil 125 of the telescope. In step 230, the digital image processor unit 160 analyzes the image to determine a relative offset between the exit pupil (identified by the bright spot in the image) and the iris of the eye. Generally, both the iris of the eye 120 and the exit pupil 125 are approximately circular, and therefore the digital image processor unit may be configured to detect and extract the locations of two approximately circular features both having their diameters approximately known. A common image processing technique by which to accomplish this task is to use the Hough Transform, as known and understood by those skilled in the art. In another example, the digital image processor unit 160 may performed a centroiding operation to determine the approximate center of each of the bright spot and the iris of the eye in the image. However, any of numerous well known image processing techniques may be used to determine the relative positioning of the iris of the eye 120 and the exit pupil 125 of the telescope. Based on the determined relative offset between the exit pupil 125 and the iris of the eye 120, the digital image processor unit 160 may calculate feedback data (step 240) which may be used to control the optical deflector unit 130 to reposition the exit pupil (step 250), as discussed above.

According to one embodiment, steps 210-250 may be performed as part of a closed loop feedback process in which the position of the exit pupil 125 is continuously or periodically (at regular or irregular intervals) relocated to maintain a sufficient match between the eye 120 and the exit pupil. In one example, the eye-shift sensor unit 155 may include a relatively high speed digital camera, for example, up to 60 frames per second, or higher, that is capable of very quickly producing images of the eye 120. Similarly, the digital image processor unit may be able to process the images and generate the feedback data multiple times per second. The optical deflector unit 130 may also be a relatively high speed device, for example, capable of operating at approximately 100 Hz, although even somewhat slower speeds for the deflector may be sufficient. Thus, with such devices operating in a closed loop feedback process, it may be possible to adjust the position of the exit pupil 125 sufficiently quickly so as to track small, relatively fast motion of the operator's eye 120 and such that the operator has the perception of a significantly larger eyebox.

Thus, aspects and embodiments may provide an apparatus in which automatic matching of the exit pupil of the optical imaging device to an operator's shifting eye may be accomplished. This may provide greatly improved ability to maintain the match even as the operator's eye, head, or hands make small movements, and may be achieved without requiring large, heavy optics. As discussed above, according to one embodiment, user perception of an expanded eyebox of a terrestrial telescope may be created by following the spatial movements of the eye/head with the original small eyebox of the telescope. In general, original optical parameters of the telescope, such as magnification, field of view, and eye relief, for example, may be substantially unchanged. Additionally, as discussed above, the optical deflector unit used to reposition the exit pupil may be located after the final intermediate focal plane of the telescope, and therefore its action does not change relationship between the image of the target and the reticle. As a result, line of sight and aiming are not disturbed by the action of the optical deflector unit. Additionally, placing the optical deflector unit at or proximate to the final intermediate focal plane may minimize any image wander caused by deflection that does not originate in the intermediate focal plane.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging device comprising:
    an eyepiece configured to produce a real exit pupil located remote from the eyepiece;
    an infrared illuminator unit configured to project infrared electromagnetic radiation onto an eye of an operator of the optical imaging device;
    an eye-shift sensor unit configured to produce an image of the eye, the image of the eye including a spot representative of the exit pupil;
    a digital image processor unit coupled to the eye-shift sensor unit and configured to receive and process the image of the eye to determine an offset between an iris of the eye and the exit pupil, and to generate feedback data based on the offset; and
    an optical deflector unit coupled to the digital image processor unit and including a field lens positioned between an intermediate focal plane and the exit pupil, proximate the intermediate focal plane, the optical deflector unit being configured to receive the feedback data from the digital image processor unit, and to automatically decenter the field lens in two orthogonal axes relative to an optical axis of the optical imaging device to relocate a position of the exit pupil of the optical imaging device from a first location to a second location responsive to the feedback data to reduce the offset between the iris of the eye and the exit pupil, wherein at the second position the exit pupil is automatically centered directly on the iris of the eye to align the exit pupil with the eye, and wherein the optical imaging device is a telescopic sight including a reticule, the optical deflector unit being further configured to maintain a relationship between the reticule and an observed image during relocation of the exit pupil.

2. The optical imaging device of claim 1, wherein the eye-shift sensor unit includes a digital camera.

3. The optical imaging device of claim 1, further comprising front optics configured to receive electromagnetic radiation and focus the electromagnetic radiation onto the intermediate focal plane; and wherein the eyepiece is configured to relay the electromagnetic radiation from the intermediate focal plane to the eye.

4. The optical imaging device of claim 3, wherein the optical deflector unit is positioned within the eyepiece.

5. The optical imaging device of claim 3, wherein the optical deflector unit is positioned between the front optics and the eyepiece.

6. A method of automatically adjusting an eyebox of an optical imaging device, the method comprising:

imaging an eye of an operator of the optical imaging device to produce an image of the eye, the image of the eye including a spot representative of an exit pupil of the optical imaging device;

analyzing the image of the eye with a digital image processor unit to determine a relative offset between an iris of the eye and the exit pupil of the optical imaging device;

controlling an optical deflector unit associated with the optical imaging device, the optical deflector unit including a field lens, wherein controlling the optical deflector unit includes controlling decentering of the field lens in two orthogonal axes relative to an optical axis of the optical imaging device to automatically relocate a position of the exit pupil from a first location to a second location to compensate for the relative offset between the iris of the eye and the exit pupil, wherein at the second location the exit pupil is automatically centered directly on the iris of the eye to align the exit pupil with the eye; and maintaining a relationship between a reticule of the optical imaging device and an observed image during relocation of the exit pupil.

7. The method of claim 6, wherein imaging the eye includes illuminating the eye with infrared electromagnetic radiation.

8. The method of claim 6, wherein controlling the optical deflector unit includes providing feedback data to the optical deflector unit from the digital image processor unit, the feedback data being based on the determined relative offset between the iris of the eye and the exit pupil of the optical imaging device.

9. An optical imaging system comprising:

an optical imaging device configured to receive and focus electromagnetic radiation to an exit pupil of the optical imaging device;

an optical deflector unit including a field lens positioned between an intermediate focal plane and the exit pupil, proximate the intermediate focal plane, the optical deflector unit being configured to redirect the electromagnetic radiation to automatically relocate a position of the exit pupil of the optical imaging device; and means for tracking movement of an eye of an operator of the optical imaging device and controlling the optical deflector unit to automatically decenter the field lens in two orthogonal axes relative to an optical axis of the optical imaging device to relocate the position of the exit pupil from a first location to a second location responsive to the movement of the eye, wherein at the second location the exit pupil is automatically centered directly on an iris of the eye so as to maintain alignment of the exit pupil and the eye, wherein the optical deflector is further configured to maintain a relationship between a reticule of the optical imaging device and an observed image during relocation of the exit pupil.

10. The optical imaging system of claim 9, wherein the optical imaging device includes:

front optics configured to receive and focus the electromagnetic radiation onto the intermediate focal plane; and an eyepiece configured to relay the electromagnetic radiation from the intermediate focal plane to the eye.

11. The optical imaging system of claim 9, wherein the means for tracking includes:

a digital camera configured to produce an image of the eye; and a digital image processor unit coupled to the digital camera and to the optical deflector unit, and configured to receive and process the image of the eye to generate feedback data for controlling the optical deflector unit.

12. The optical imaging system of claim 11, wherein image of the eye includes a spot representative of the exit pupil, and wherein the digital image processor unit is configured to process the image of the eye to determine an offset between the exit pupil and the iris of the eye, and to generate the feedback data based on the offset.

13. The optical imaging system of claim 11, wherein the means for tracking further includes an infrared illuminator unit configured to illuminate the eye with infrared electromagnetic radiation.

* * * * *

UNITED STATES PATENT AND TRADEMARK OFFICE
CERTIFICATE OF CORRECTION

| | |
|---|---|
| PATENT NO. | : 9,557,553 B2 |
| APPLICATION NO. | : 14/050887 |
| DATED | : January 31, 2017 |
| INVENTOR(S) | : Szapiel |

It is certified that error appears in the above-identified patent and that said Letters Patent is hereby corrected as shown below:

In the Specification

Column 6, Line 48, delete "minors" and insert --mirrors--.

Signed and Sealed this
Eighteenth Day of April, 2017

Michelle K. Lee
*Director of the United States Patent and Trademark Office*